US009864542B2

(12) United States Patent
Li et al.

(10) Patent No.: US 9,864,542 B2
(45) Date of Patent: *Jan. 9, 2018

(54) DATA DEDUPLICATION USING A SOLID STATE DRIVE CONTROLLER

(71) Applicant: Alibaba Group Holding Limited, Georgetown, Grand Cayman (KY)

(72) Inventors: Shu Li, Santa Clara, CA (US); Yong Li, Beijing (CN); Gongbiao Niu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,256

(22) Filed: May 8, 2017

(65) Prior Publication Data

US 2017/0242616 A1    Aug. 24, 2017

Related U.S. Application Data

(63) Continuation of application No. 14/858,257, filed on Sep. 18, 2015, now Pat. No. 9,665,287.

(51) Int. Cl.
G06F 12/00 (2006.01)
G06F 3/06 (2006.01)
G06F 13/42 (2006.01)

(52) U.S. Cl.
CPC .......... *G06F 3/0641* (2013.01); *G06F 3/0608* (2013.01); *G06F 3/0611* (2013.01); *G06F 3/0673* (2013.01); *G06F 13/42* (2013.01); G06F 2213/0032 (2013.01)

(58) Field of Classification Search
None
See application file for complete search history.

(56) References Cited

U.S. PATENT DOCUMENTS

| 7,567,188 | B1 | 7/2009 | Anglin et al. |
| 7,636,767 | B2 | 12/2009 | Lev-Ran et al. |
| 7,814,149 | B1 | 10/2010 | Stringham |
| 7,840,537 | B2 | 11/2010 | Gokhale et al. |
| 8,185,498 | B2 | 5/2012 | Anglin |
| 8,204,867 | B2 | 6/2012 | Benhase et al. |

(Continued)

FOREIGN PATENT DOCUMENTS

CN    104407982 A    3/2015

OTHER PUBLICATIONS

"Smart In-Network Deduplication for storageaware SDN" Hua, et al. Copyright SIGCOMM'13 Aug. 12-16, 2013 Hong Kong, China pp. 509.510.

*Primary Examiner* — John A Lane

(57) ABSTRACT

A data deduplication method is executed by a controller for a solid state drive (SSD). The controller receives a signature for a block of data. The controller performs a comparison of the signature and information in a signature library and determines whether or not the signature matches the information. The controller sends a signal that indicates a result of the comparison. If the signature and the information match then the signal has a first value indicating that the block of data is already stored on the SSD; if the signature and the information do not match then the signal has a second value that is different than the first value.

18 Claims, 8 Drawing Sheets

(56) References Cited

U.S. PATENT DOCUMENTS

| | | | |
|---|---|---|---|
| 8,281,066 B1 * | 10/2012 | Trimmer | G06F 3/0641 |
| | | | 711/103 |
| 8,321,384 B2 | 11/2012 | Tokoro | |
| 8,321,648 B2 | 11/2012 | Condict | |
| 8,332,372 B2 | 12/2012 | Tzur et al. | |
| 8,370,315 B1 | 2/2013 | Efstathopoulos et al. | |
| 8,370,593 B2 | 2/2013 | Arakawa et al. | |
| 8,407,186 B1 | 3/2013 | Cremelie et al. | |
| 8,407,193 B2 | 3/2013 | Gruhl et al. | |
| 8,412,682 B2 | 4/2013 | Zheng et al. | |
| 8,442,954 B2 | 5/2013 | Spackman | |
| 8,478,730 B2 | 7/2013 | Aronovich et al. | |
| 8,478,933 B2 | 7/2013 | Haustein et al. | |
| 8,484,170 B2 | 7/2013 | Aronovich et al. | |
| 8,495,304 B1 | 7/2013 | Natanzon et al. | |
| 8,533,231 B2 | 9/2013 | Aizman et al. | |
| 8,572,312 B2 | 10/2013 | Tofano | |
| 8,600,949 B2 | 12/2013 | Periyagaram et al. | |
| 8,607,017 B2 | 12/2013 | Condict | |
| 8,626,723 B2 | 1/2014 | Ben-Shaul et al. | |
| 8,639,658 B1 | 1/2014 | Kumaresan | |
| 8,762,352 B2 | 6/2014 | Amit et al. | |
| 8,788,468 B2 | 7/2014 | Amit et al. | |
| 8,812,461 B2 | 8/2014 | Li et al. | |
| 8,812,874 B1 | 8/2014 | Clifford | |
| 8,825,617 B2 | 9/2014 | Haas et al. | |
| 8,898,119 B2 | 11/2014 | Sharma et al. | |
| 8,898,120 B1 | 11/2014 | Efstathopolous | |
| 8,930,612 B2 | 1/2015 | Goss et al. | |
| 8,930,648 B1 | 1/2015 | Storer et al. | |
| 8,935,222 B2 | 1/2015 | Hirsch et al. | |
| 8,935,487 B2 | 1/2015 | Sengupta et al. | |
| 9,047,301 B2 | 6/2015 | Petrocelli | |
| 9,053,032 B2 | 6/2015 | Sengupta et al. | |
| 9,075,842 B2 | 7/2015 | Aronovich et al. | |
| 9,081,809 B2 | 7/2015 | Aronovich et al. | |
| 9,092,151 B1 | 7/2015 | Floyd et al. | |
| 9,116,941 B2 | 8/2015 | Aronovich | |
| 9,223,511 B2 | 12/2015 | Rudelic | |
| 9,244,937 B2 | 1/2016 | Akirav et al. | |
| 9,489,312 B2 * | 11/2016 | Madan | G06F 17/00 |
| 9,665,287 B2 | 5/2017 | Li et al. | |
| 2009/0132616 A1 | 5/2009 | Winter et al. | |
| 2009/0307416 A1 | 12/2009 | Luo et al. | |
| 2011/0093439 A1 | 4/2011 | Guo et al. | |
| 2011/0276781 A1 * | 11/2011 | Sengupta | G06F 12/0862 |
| | | | 711/216 |
| 2012/0117309 A1 | 5/2012 | Schuette | |
| 2013/0151759 A1 * | 6/2013 | Shim | G06F 12/0246 |
| | | | 711/103 |
| 2013/0282672 A1 * | 10/2013 | Tashiro | G06F 3/0608 |
| | | | 707/692 |
| 2013/0290277 A1 | 10/2013 | Chambliss et al. | |
| 2014/0074804 A1 * | 3/2014 | Colgrove | G06F 17/30159 |
| | | | 707/692 |
| 2014/0304464 A1 | 10/2014 | Bert | |
| 2015/0161000 A1 * | 6/2015 | Kim | G06F 11/108 |
| | | | 714/6.24 |
| 2016/0070716 A1 * | 3/2016 | Bares | G06F 17/30159 |
| | | | 707/692 |
| 2016/0335024 A1 * | 11/2016 | Zhong | G06F 3/0641 |
| 2016/0357477 A1 * | 12/2016 | Nakajima | G06F 3/0641 |
| 2017/0017571 A1 * | 1/2017 | Choi | G06F 12/0246 |
| 2017/0115922 A1 * | 4/2017 | Imaeda | G06F 3/0631 |

* cited by examiner

DATA DEDUPLICATION USING A SOLID STATE DRIVE CONTROLLER

RELATED U.S. APPLICATION

This application is a continuation application of and claims priority to application Ser. No. 14/858,257, filed Sep. 18, 2015, by S. Li et al., entitled "Data Deduplication Using a Solid State Drive Controller," now U.S. Pat. No. 9,665,287, which is hereby incorporated by reference in its entirety.

BACKGROUND

Contemporary businesses accumulate tremendous amounts (e.g., petabytes) of data in databases that are stored on all kinds of media such as tapes, hard disk drives, solid state drives (SSDs), etc. Legal requirements, government rules and regulations, and business rules and best practices require that the databases are archived and backed up frequently. Consequently, thousands of petabytes (PBs) of data are already being stored, and the amount of stored data continues to skyrocket.

Data deduplication methods and systems are used to reduce the amount of data to increase efficiency and reduce costs. In general, a deduplication system finds identical parts in different data files and stores those identical parts only once. The deduplication system also maintains metadata so that the data files can be organized and rebuilt at a later time when they are accessed. However, the tremendous amounts of data being stored test the limits of existing deduplication methods and systems. Current deduplication methods and systems work well for several petabytes of data but are not designed for amounts of data on the scale of thousands of petabytes.

The use of SSDs (instead of other storage media such as random access memory (RAM)) to store large amounts of data presents some challenges. SSDs have longer read and write latencies relative to, for example, double data rate type three synchronous dynamic RAM (DDR3 DRAM). Also, SSDs are erased before being written to and can only be erased a limited number of times before wearing out.

On the other hand, SSDs have a number of advantages that make them a good choice for storing large amounts of data. For deduplication, files are split into blocks or fragments commonly referred to as "chunks" (e.g., four kilobyte (KB), 16 KB, or 256 KB chunks) with associated metadata. Each unique chunk is stored with its metadata. The metadata may be, for example, 16 bytes (B), 32 B, 128 B, or 256 B in size. For 512 PB of data, assuming each chunk is 16 KB in size and also assuming 32 B of metadata per chunk, the storage space for just the metadata is one PB. Storing this amount of data is not practical using RAM, but is practical using SSDs.

Also, to satisfy the aforementioned regulations and requirements, the metadata needs to be hard-written into storage. When power to RAM is lost or interrupted, the data held by the RAM is lost. SSDs use NAND-based flash memory, for example, which retains data without power.

Thus, the advantages of SSDs include their capacity and non-volatility. To mitigate their longer access time (read and write latencies), data is written in parallel. The basic unit of each SSD read/write operation is referred to as a page. For a page size of 16 KB, assuming 128 B of metadata per chunk, the metadata for 128 chunks can be read or written in parallel within a page.

The metadata for each chunk includes a hash value, or signature, that uniquely identifies the chunk. Hence, to determine whether it is necessary to store a new chunk (to determine whether an identical chunk has been previously stored), the signature for the new chunk can be compared to signatures for chunks that have already been stored. If the signature for the new chunk matches an existing signature, then the new chunk does not need to be stored.

As noted above, the basic unit of an SSD read/write operation is a page. To get the signature of a chunk for comparison to other signatures, an entire page (e.g., 16 KB) is read and transferred from the SSD to the central processing unit (CPU). This transfer can consume a significant amount of resources on the CPU as well as memory bandwidth and bus bandwidth.

More specifically, a client with data to be stored on a storage server will split the data into chunks and calculate a signature for each chunk. In an implementation, the client sends each signature to a signature server that holds a library of signatures for chunks already stored on the storage server. The signature server's role is to determine whether the signatures from the client match any of the signatures in the signature library. To accomplish this, an entire page (e.g., 16 KB) is transferred to memory for each signature, and the CPU will locate and extract the signature within the page and compare the extracted signature to the signatures from the client. However, a signature may be only 32 B in size. Thus, to get a signature for comparison to other signatures, up to 500 times more data than is needed is read and transferred (e.g., 16 KB of data is read to get a 32 B signature).

Furthermore, based on the number of clients that are requesting signature comparisons and the number of signature servers, the number of comparisons per signature server can be estimated. Each comparison requires at least two input/output (I/O) accesses, so the number of I/O operations per second (IOPS) per signature server can also be estimated. Considering CPU and SSD capabilities, the IOPS requirements turn out to be so large that a large number of signature servers are needed, and it is also necessary to use more expensive, higher bandwidth Peripheral Component Interconnect Express (PCIe) SSDs to provide the necessary capacity.

In summary, conventional deduplication methods are inefficient, expensive, and occupy significant amounts of CPU, memory, and bus resources.

SUMMARY

Embodiments according to the present invention address the problems described above by accomplishing signature comparisons in the SSD. As a result, the CPU's workload is reduced and the amount of data being transferred between the SSD and the CPU is reduced, thereby also reducing the impact on memory and on bus bandwidth.

In embodiments according to the present invention, a data deduplication method is executed by a controller for an SSD. The controller receives a first signature for a block or fragment (a "chunk") of data from the CPU. The controller performs a comparison of the first signature and information in a signature library and determines whether or not the first signature matches the information. The controller sends a signal to the CPU that indicates a result of the comparison. If the first signature matches information in the signature library, then the signal has a first value indicating that the chunk of data is already stored on the SSD; if the first signature does not match information in the signature library, then the signal has a second value that is different than the first value. If the first signature does not match information in the signature library (e.g., if the signal has the second value), then the chunk of data is received from its source (e.g., a client) and written to the SSD.

In an embodiment, the controller also receives an address associated with the first signature from the CPU. In such an embodiment, the controller uses the address to locate an entry in the signature library. The controller then compares the signature to the information at that entry. That information may be a second signature, or it may be a null value (e.g., the entry may not hold any information). The controller then sends a signal to the CPU to indicate the result of the comparison as described above.

In an embodiment, the signal from the SSD controller to the CPU consists of a single binary bit that has the first value if the first signature matches information in the signature library and that has the second value if the first signature does not match information in the signature library.

In an embodiment, if the first signature matches information in the signature library, then a counter associated with the chunk of data is incremented. If the first signature does not match information in the signature library, then the first signature is added to the signature library and a counter associated with the chunk of data is initialized and incremented.

In an embodiment, the controller includes, in addition to conventional components, a deduplication processor that compares the first signature and information from the signature library. In one such embodiment, the deduplication processor includes a number of gates that perform a bit-by-bit comparison of the first signature and information from the signature library.

In an embodiment, the SSD is a Serial Advanced Technology Attachment (SATA) SSD.

Embodiments according to the invention can be used for efficient deduplication in large-scale data applications where the amounts of stored data are measured in terms of exabytes (EBs). Fewer IOPS are required, and so embodiments according to the invention can be implemented using less expensive SATA SSDs.

These and other objects and advantages of the various embodiments of the present invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments of the present disclosure and, together with the detailed description, serve to explain the principles of the disclosure.

DETAILED DESCRIPTION

Figure 1:
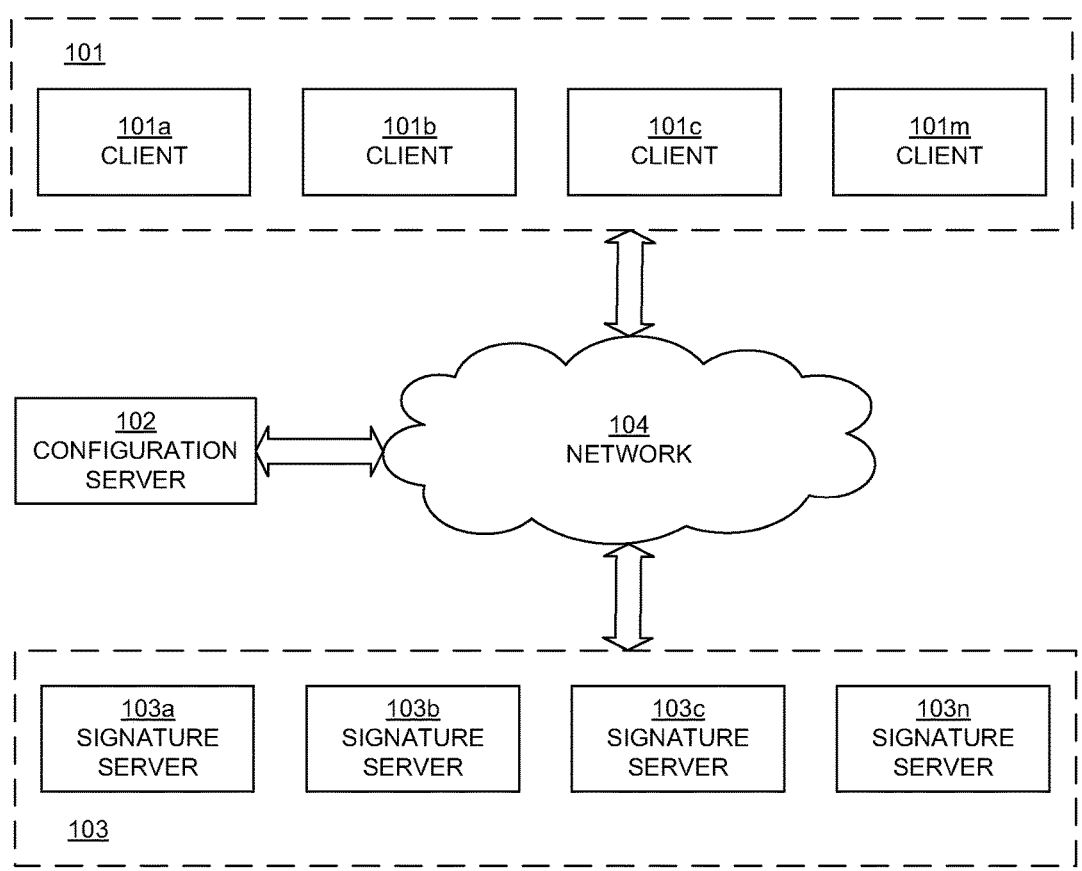
FIG. 1 is a block diagram illustrating an example of a system upon which a deduplication system can be implemented in an embodiment according to the invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "storing," "reading," "writing," "indexing," "performing," "sending," "comparing," "adding," "accessing," "locating," "using," "determining," "generating," "incrementing," "signaling," or the like, refer to actions and processes (e.g., flowcharts 400, 600, and 700 of FIGS. 4, 6, and 7, respectively) of an apparatus or computer system or similar electronic computing device or processor (e.g., the computer system 200 of FIG. 2). A computer system or similar electronic computing device manipulates and transforms data represented as physical (electronic)

quantities within memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory (e.g., an SSD) or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram illustrating an example of a network or system 100 upon which a deduplication system can be implemented in an embodiment according to the invention. In the example of FIG. 1, the system 100 includes: a number of clients 101a, 101b, 101c, . . . , 101m, which may be singularly referred to as a client 101m or collectively referred to as the clients 101; one or more configuration servers 102; and a number of signature servers 103a, 103b, 103c, . . . , 103n, which may be singularly referred to as the signature server 103n and collectively referred to as the signature servers 103. The clients 101, signature servers 103, and configuration server 102 are communicatively coupled (wired or wirelessly) via a network 104 (e.g., the Internet, but not so limited).

The clients 101 may themselves be servers. In general, the clients 101 have data files that they have generated or that they have received from other devices or systems (not shown). A client 101m splits the data files that it has into smaller pieces (e.g., blocks or fragments, commonly referred to as chunks). For each such chunk, the client 101m calculates a signature Scp that uniquely identifies the chunk and sends the signature to the signature servers 103. In an embodiment, the signatures from the client 101m are sent in batch mode; thus, multiple signatures (e.g., hundreds of signatures) can be grouped into a single data package and sent to the signature servers 103 for comparison.

In an embodiment, a signature for a chunk is calculated by applying a hash function to the contents of the chunk. In an embodiment, metadata is associated with each chunk, and the signature for a chunk is included in the metadata for that chunk. The metadata for a chunk may include information in addition to the signature for the chunk. For example, the metadata can include information that can be used to combine the chunk with other chunks associated with a data file in order to reconstruct the data file. For example, in addition to the signature, the metadata may include an address that points to where the data for the chunk is stored, and an appendix that identifies how (e.g., in what order) the chunk is to be combined with other chunks to reconstruct the data file.

The configuration server 102 schedules and controls traffic between the clients 101 and the signature servers 103. The configuration server 102 directs the signatures from the clients 101 to the proper signature server.

A signature server 103n receives signatures from the clients 101 as directed by the configuration server 102, looks up entries (content or information, e.g., signatures) in its signature library, compares the signatures from the clients and the information from the signature library and, for each signature Scp that it receives, notifies the clients with regard to whether or not the signature Scp matches information in its signature library.

As previously described herein, deduplication involves determining whether or not it is necessary to store a new chunk by comparing signatures for chunks that have already been stored to the signature for the new chunk to determine whether a chunk identical to the new chunk has been previously stored. If the signature for the new chunk matches an existing signature, then the new chunk does not need to be stored.

Figure 2:
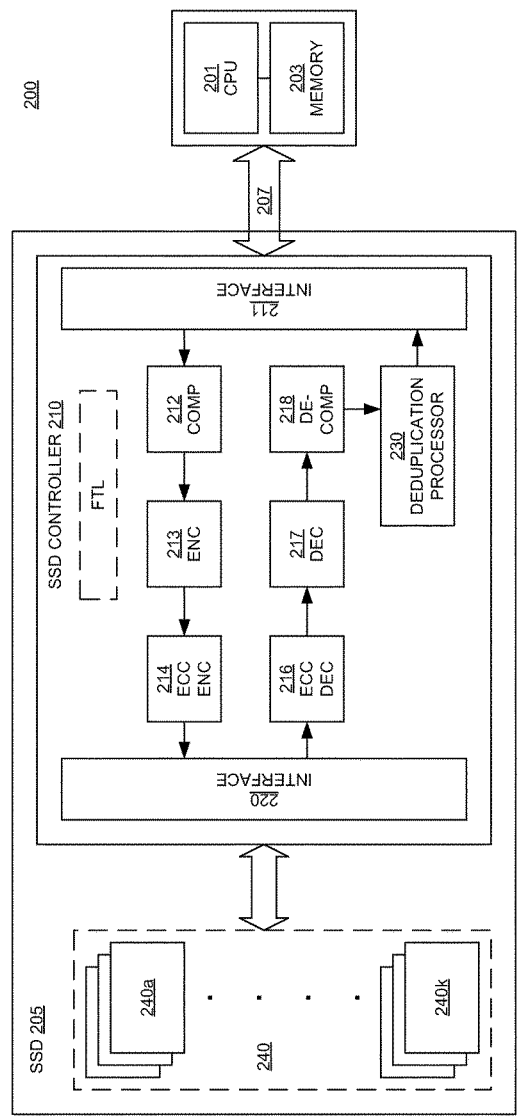
FIG. 2 is a block diagram illustrating elements of a computer system in an embodiment according to the present invention.

FIG. 2 is a block diagram illustrating elements of a computer system 200 in an embodiment according to the present invention. In an embodiment, the computer system 200 represents a platform for implementing the signature servers 103 (FIG. 1). In the example of FIG. 2, the computer system 200 includes a central processing unit (CPU) 201, a memory 203, and a solid state device (SSD) 205. The memory 203 may be, for example, dynamic random access memory (DRAM). In an embodiment, the SSD 205 is a Serial Advanced Technology Attachment (SATA) SSD and is coupled to the CPU 201 via a SATA bus 207. The computer system 200 may include elements other than those shown.

Figure 3:
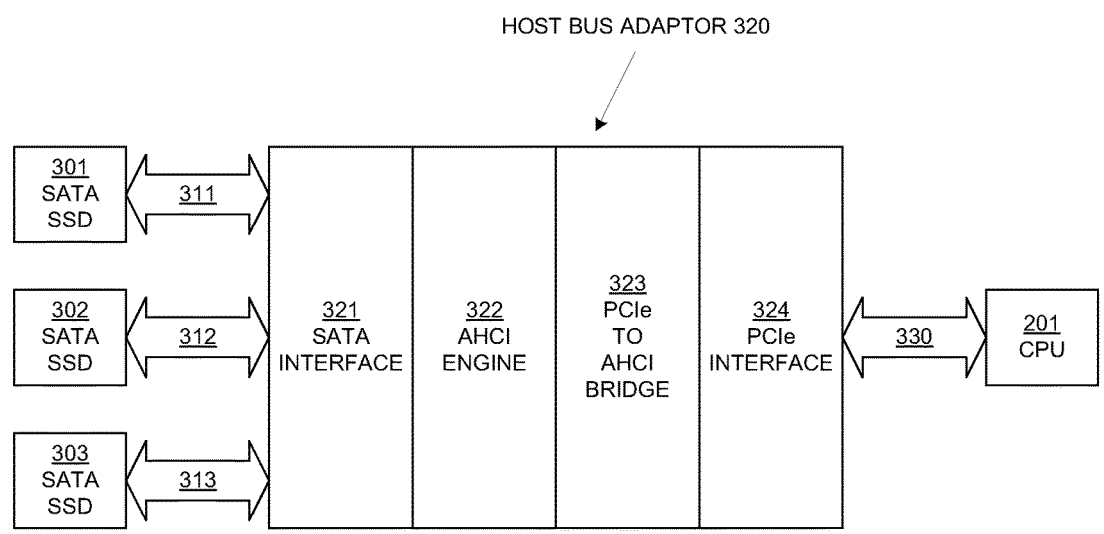
FIG. 3 is a block diagram showing a connection between SATA SSDs and a central processing unit in an embodiment according to the present invention.

FIG. 3 is a block diagram showing a connection between SATA SSDs 301, 302, and 303 and the CPU 201 in an embodiment according to the present invention. The SSDs 301-303 are coupled to a host bus adaptor (HBA) 320 via SATA buses 311, 312, and 313, respectively. In an embodiment, the HBA adaptor 320 includes a SATA interface 321, an Advanced Host Controller Interface (AHCI) engine 322 (e.g., a hardware mechanism that allows software to communicate with a SATA device; a bus master to system memory), a Peripheral Component Interconnect Express (PCIe)-to-AHCI bridge 323 (e.g., to translate data between the SATA and PCIe formats), and a PCIe interface 324. The HBA 320 is coupled to the CPU 201 via a PCIe bus 330.

With reference again to FIG. 2, the SSD 205 includes a controller 210 and a number of storage elements, specifically a number of dies or chips 240a-240k that are used to store data. The dies 240a-240k may be singularly referred to as the die 240k and collectively referred to as the dies 240. In an embodiment, the dies 240 are NAND dies, and as such the SSD 205 may be referred to as a NAND flash device.

The controller 210 can be implemented as an application-specific integrated circuit (ASIC) or field-programmable gate array (FPGA) that is embedded in the SSD 205. In the embodiment of FIG. 2, the controller 210 includes a flash translation layer (FTL), which may be implemented in firmware or as software. The controller 210 also includes a write path and a read path. The write path starts at the interface 211, which includes, for example, a physical layer (PHY) interface and a serializer/deserializer that converts data between the analog and digital domains (from analog to digital, and from digital to analog). The write path may include a data compression block 212, an encryption block 213, and an error correction code (ECC) encoding block 214. The SSD controller is coupled to the dies 240 via an interface 220 (e.g., an Open NAND Interface, ONFI). Data is moved to the dies 240 using a synchronous and asynchronous trigger mode (toggle).

Data is moved to the read path from the dies 240 via the same toggle mechanism and interface 220. The read path may include an ECC decoding block 216, a decryption block 217, and a decompression block 218.

Significantly, and in contrast to conventional SSD controllers, the controller 210 includes a deduplication processor 230 in the read path. As will be described more fully below, the deduplication processor 230 performs at least two main functions: it extracts information (e.g., signatures) from the dies 240, and it compares those signatures with a signature received from a client 101m to determine whether the signature from the client matches the extracted information (e.g., whether the signature matches any of the extracted signatures).

Figure 4:
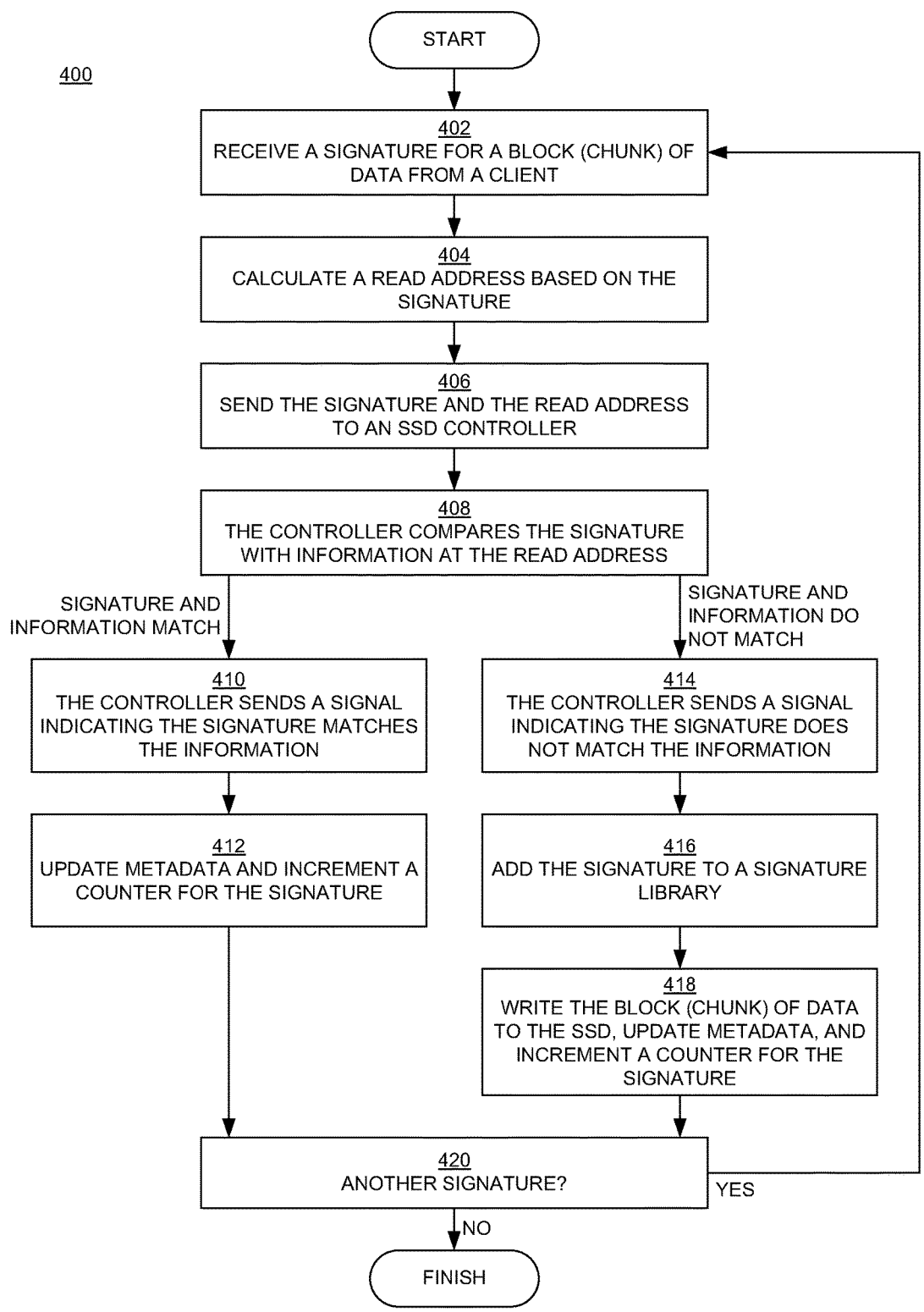
FIG. 4 is a flowchart of a deduplication method in an embodiment according to the present invention.

FIG. 4 is a flowchart 400 of a deduplication method in an embodiment according to the present invention. All or some of the operations represented by the blocks in the flowchart 400 can be implemented as computer-executable instructions residing on some form of non-transitory computer-readable storage medium, and performed by a signature server or computer system such as the signature server 103n or the computer system 200 of FIGS. 1 and 2, respectively.

In block 402 of FIG. 4, a signature Scp for a block (e.g., a chunk) of data is received from a client (e.g., the client 101m of FIG. 1).

In block 404 of FIG. 4, in an embodiment, a read address (Raddr) is calculated based on the signature Scp.

In block 406, the signature Scp is sent to the SSD controller 210 (FIG. 2). In an embodiment, the read address Raddr is also sent to the SSD controller 210. In such an embodiment, the controller uses the read address Raddr to locate an entry in a signature library stored on the dies 240 (FIG. 2). More specifically, the controller 210 can use the read address Raddr as an index to a particular entry in a signature library that is stored on one of the dies 240 (e.g., the die 240k). The entry may be a signature, or it may be a null value (e.g., the entry may be vacant). Generally speaking, there is content or information Rssd at the entry indexed by the read address Raddr; that content may or may not be a signature, and even the lack of content (e.g., a null or vacant entry) conveys information.

In block 408 of FIG. 4, the SSD controller 210 compares the signature Scp with the information Rssd. In an embodiment, the comparison is performed using the deduplication processor 230 (FIG. 2). Additional information is provided in connection with FIG. 5 below.

If the signature Scp matches the information Rssd, then the flowchart 400 proceeds to block 410; otherwise, the flowchart proceeds to block 414.

In block 410 of FIG. 4, the signature Scp matches the information Rssd. In that case, the information Rssd constitutes a second signature identical to the first signature Scp, which indicates that the chunk of data that is associated with the signature Scp has already been stored on the SSD 205 and it is not necessary to rewrite that chunk of data to the SSD. Accordingly, the controller 210 sends a signal to the CPU 201. In an embodiment, the signal consists of a single binary bit. The bit value has a first value (e.g., binary one, or high) to indicate that the signature Scp matches the information Rssd.

Continuing with reference to FIG. 4, in block 412, metadata associated with the signature Scp is updated and a mapping count is incremented. The metadata is used to recover or help recover the data file that includes the chunk that is associated with the signature Scp. The mapping count identifies how many times that chunk is used (e.g., how many data files contain that chunk).

In block 414, the signature Scp does not match the information Rssd, which indicates that the chunk of data that is associated with the signature Scp is not currently stored on the SSD 205 and so that chunk of data can be written to the SSD. As in block 410, the controller 210 sends a signal to the CPU 201. In an embodiment, the signal again consists of a single binary bit. However, the bit value has a second value (e.g., binary zero, or low) to indicate that the signature Scp does not match the information Rssd.

In block 416, the controller 210 adds the signature Scp into the signature library. In an embodiment, the controller 210 adds the signature Scp into the entry in the signature library identified by the read address Raddr.

In block 418, the chunk of data is written to the SSD 205. In an embodiment, the chunk of data is written to the die 240k that stores the signature library indexed by the read address Raddr. Also, metadata associated with the signature Scp is updated and a mapping count for the chunk is started (incremented) by the controller 210. The controller 210 can also confirm that the signature library has been updated and that the chunk is saved.

In block 420, if there is another signature for another chunk of data, then the flowchart 400 returns to block 402.

Embodiments according to the invention are not limited to the use of a read address Raddr to find an entry for comparison to the signature Scp in order to determine whether the chunk of data has already been stored on the SSD 205. Other techniques can be used to compare the signature Scp with information in the signature library. One such technique is known as the Cuckoo search algorithm. Other techniques known as particle swarm optimization, differential evolution, and artificial bee colony algorithm may also be used.

As mentioned above, signatures from the clients 101 can be sent in batch mode; thus, multiple signatures (e.g., hundreds of signatures) can be grouped into a single data package and sent to the signature servers 103, in which case the operations of the flowchart 400 can be performed in parallel for each signature. In an embodiment, this can be implemented using a multi-bit bus between the SSD and the CPU, where each bit in the bus denotes whether or not an individual signature has been matched by information in the signature library as described above. This functionality can instead be implemented with a multi-bit register that is polled regularly to get its status.

Figure 5:
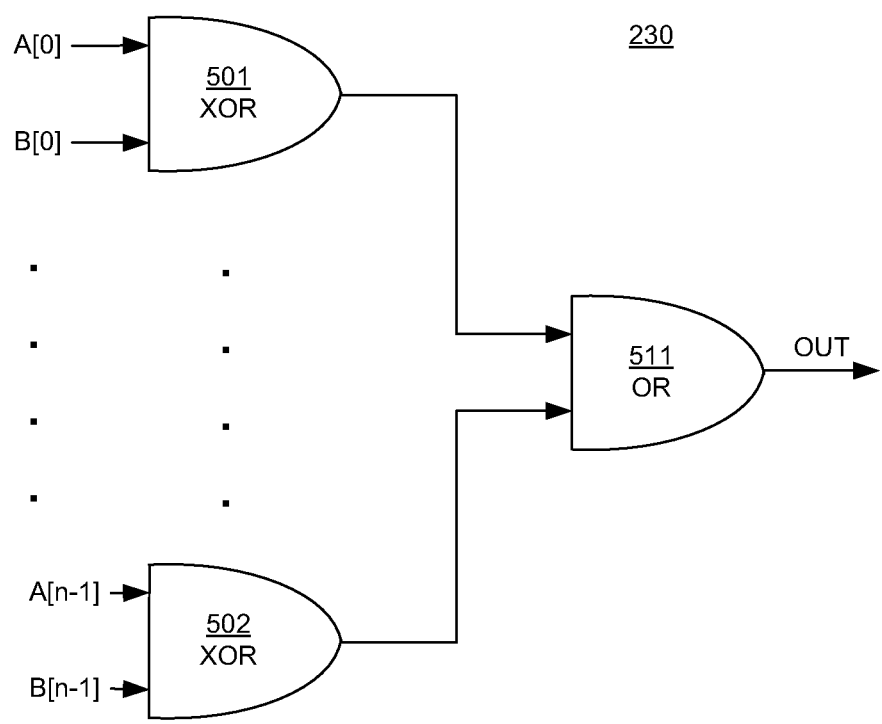
FIG. 5 illustrates a circuit that can be used to implement a deduplication processor in an embodiment according to the present invention.

Also as mentioned above, with reference back to FIG. 2, the controller 210 includes a deduplication processor 230 in the read path. FIG. 5 illustrates a circuit that can be used to implement the deduplication processor 230 in an embodiment according to the present invention. In FIG. 5, "A" is used in reference to the signature Scp, and "B" is used in reference to the information that the signature Scp is being compared against (e.g., the information at the entry indexed by the read address Raddr, or the information in the signature library that is searched using an algorithm such as those mentioned above). The bits in A are identified as A[0], . . . , A[n-1], and the bits in B are identified as B[0], . . . , B[n-1].

During the operations described by block 406 of FIG. 4, the signature Scp (A) can be held in a buffer (not shown) in the write path of the controller 210 for a certain amount of time until the information (B) is read. Then, after the information (B) is read, the signature Scp (A) and the information (B) can be compared bit-by-bit using the deduplication processor 230 of FIG. 5.

In the embodiment of FIG. 5, the deduplication processor 230 includes a number of exclusive-OR (XOR) gates exemplified by the XOR gates 501 and 502. The XOR gate 501 compares the first bit (A[0]) of the signature Scp (A) with the first bit (B[0]) of the information (B), another XOR gate (not shown) compares the second bit of the signature Scp (A) with the second bit of the information (B), and so on, with the XOR gate 502 comparing the last bit (A[n-1]) of the signature Scp (A) with the last bit (B[n-1]) of the information (B). If all of the bits match, then the OR gate 511 will output a binary zero; otherwise, the output of the OR gate will be a binary one. This can be expressed as: Out= (A==B)? 1'b0: 1'b1.

Thus, the deduplication processor 230 can be implemented using basic circuit elements (e.g., gates). Therefore, the deduplication processor 230 can be readily and inexpensively added to a conventional SSD controller design. Furthermore, it may be possible for the deduplication processor 230 to share some circuit elements with other modules in the SSD controller, such as the ECC decoding block 216, the decryption block 217, and/or the decompression block 218, thereby further helping to control costs.

To summarize, in embodiments according to the present invention, the internal processing circuitry of an SSD is designed so that the signature comparison can be performed by the SSD (specifically, by the SSD controller) instead of on the CPU. Consequently, the CPU's workload is reduced and the amount of data transferred between the SSD and the CPU is significantly reduced.

The CPU sends a signature Scp to the SSD. In an embodiment, the CPU also sends a read address Raddr based on the signature Scp to the SSD. The SSD sends a signal to the CPU that indicates whether or not the signature Scp matches information in the signature library. Multiple signatures, read addresses, and signals can be sent in batch mode and processed in parallel as previously described herein.

Embodiments according to the invention effectively utilize the block write and block read characteristics of an SSD (e.g., NAND flash device). Also, bandwidth is no longer consumed by transferring non-used data from the SSD to the CPU as opposed to conventional approaches. As a result, the number of input/output operations per second (IOPS) on the SSD is dramatically reduced, from about 500,000 to about 9,000. Required performance is sustained but at a reduced cost in terms of CPU, memory, and bandwidth consumption.

Also, by improving the efficiency at which the data is processed, SATA SSDs can be used in the signature servers, which are less expensive than PCIe SSDs. Furthermore, more SATA SSDs than PCIe SSDs can be configured and connected with each CPU core. Thus, hardware costs are also reduced.

Figure 6:
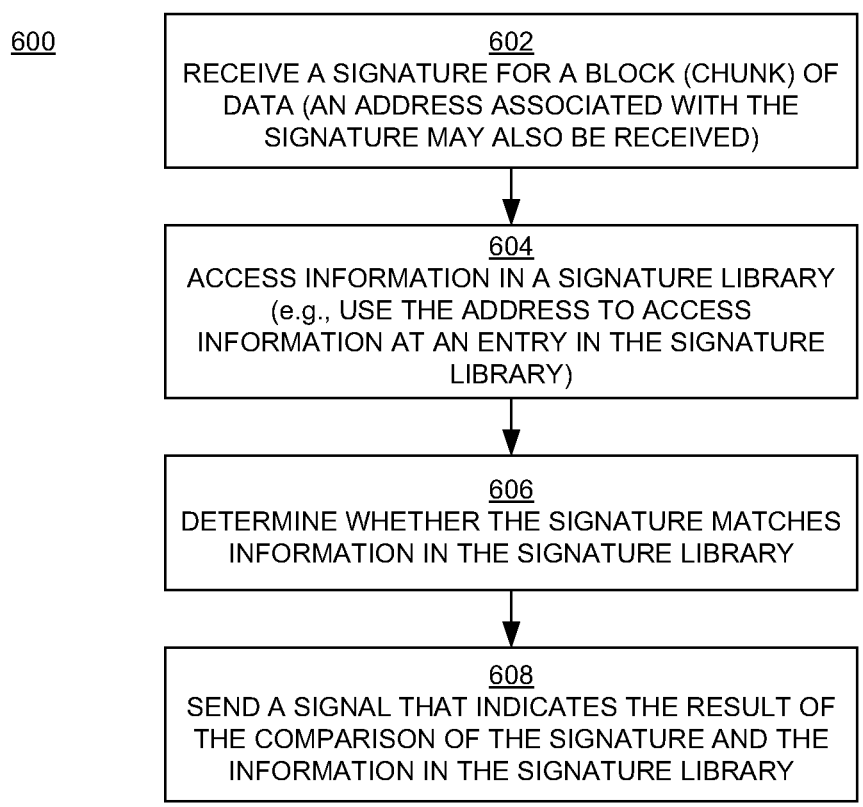
FIG. 6 is a flowchart of a data deduplication method executed by a controller for an SSD in an embodiment according to the present invention.

FIG. 6 is a flowchart 600 of a data deduplication method executed by a controller (e.g., the controller 210 of FIG. 2) for an SSD in an embodiment according to the present invention.

In block 602 of FIG. 6, a signature Scp for a block (fragment, piece, chunk) of data is received by the controller from a CPU. In an embodiment, an address Raddr associated with the signature is also received by the controller from the CPU.

In block 604, information in a signature library is accessed by the controller. In an embodiment, the address Raddr is used by the controller to index an entry in the signature library.

In block 606, a determination is made by the controller with regard to whether the signature Scp matches information in the signature library. That is, the controller determines whether the signature Scp matches any other signature in the signature library. In an embodiment, the controller determines whether the signature Scp matches the information at the entry addressed by the address Raddr.

In block 608, a signal that indicates the result from block 606 is sent from the controller to the CPU. If the signature Scp matches information in the signature library, then the signal has a first value indicating that the block of data is already stored on the SSD. If the signature Scp does not match information in the signature library, then the signal has a second value that is different from the first value.

If the signature Scp does not match information in the signature library, then the block of data is written to the SSD. If the signature Scp does not match information in the signature library, then the signature is added to the signature library and a counter associated with the block of data is initialized and incremented. If the signature Scp matches information in the signature library, then a counter associated with the block of data is incremented.

Figure 7:
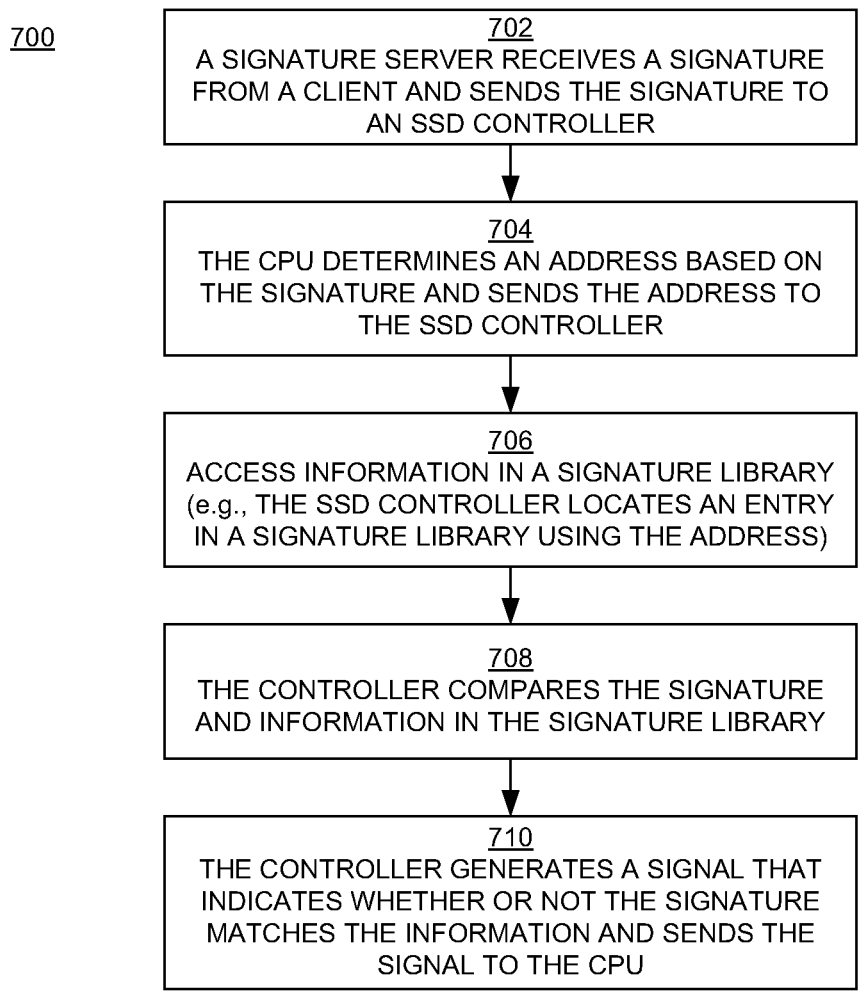
FIG. 7 is a flowchart of a data deduplication method executed by a signature server that includes a CPU and an SSD in an embodiment according to the present invention.

FIG. 7 is a flowchart 700 of a data deduplication method executed by a signature server 103n (FIG. 1) that includes a CPU and an SSD, with an SSD controller, in an embodiment according to the present invention.

In block 702 of FIG. 7, a signature Scp for a block (piece, fragment, chunk) of data is received from a client 101m. The CPU sends the signature to the SSD controller.

In block 704, in an embodiment, an address Raddr based on the signature is determined (e.g., by the CPU). In such an embodiment, the CPU sends the address Raddr to the SSD controller.

In block 706, information in a signature library is accessed by the SSD controller. In an embodiment, an entry in the signature library is located by the SSD controller using the address Raddr.

In block 708, the SSD controller compares the signature Scp and information from the signature library. In an embodiment, the SSD controller compares the signature and information at the entry in the signature library addressed by the address Raddr.

In block 710, the controller generates a signal that indicates whether or not the signature Scp matches information in the signature library and sends the signal to the CPU. If the signature Scp matches information in the signature library, then the block of data is already stored on the SSD. If the signature Scp does not match information in the signature library, then the signal is sent from the signature server to the client, the block of data is received at the signature server from the client in response to the signal, and the block of data is written to the SSD.

Figure 8:
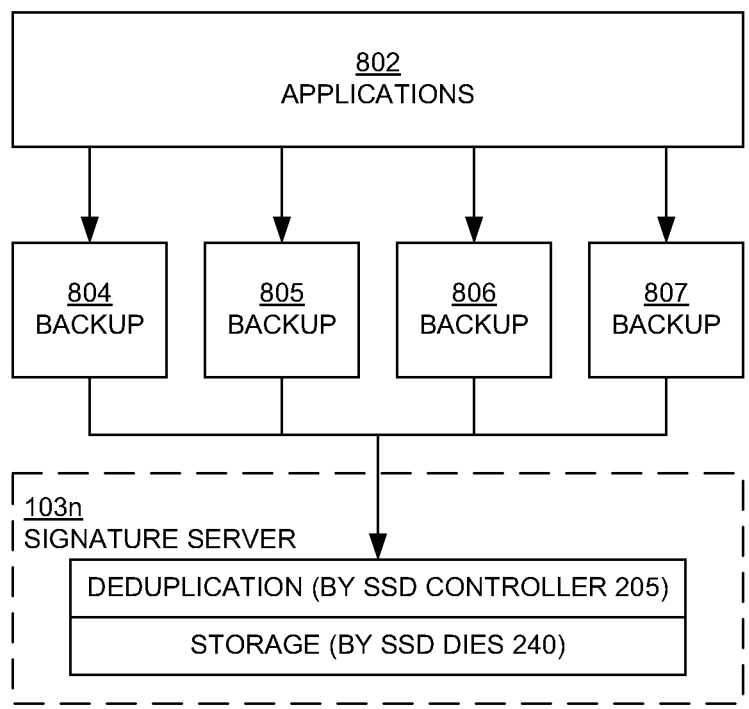
FIG. 8 is a block diagram illustrating an example of an implementation of a deduplication system in an embodiment according to the present invention.

FIG. 8 is a block diagram illustrating an example of an implementation of a deduplication system 800 in an embodiment according to the invention. The deduplication system 800 can be deployed on storage clusters, and can work directly on the backup copies 804, 805, 806, and 807 to be stored by the applications 802. Analyzing the data's redundancy at the global level, the deduplication system 800 removes deduplicated blocks and keeps only unique blocks while also updating the associated metadata. Later, when certain data is accessed or updated, the metadata and unique blocks are modified. By this mechanism, the amount of storage consumed by the backups 804-807 is significantly reduced, by an order of magnitude, for example.

SATA SSDs instead of PCIe SSDs can be used as mentioned above. Each signature server is able to drive more SSDs, for example, 12 SATA SSDs versus four PCIe cards. As a result of the present invention, each SATA SSD performs equally as well as PCIe SSDs in terms of satisfying deduplication needs. Thus, each signature server's capability is improved by three times; in other words, for the same performance, the number of signature servers can be reduced by one-third. Thus, costs are reduced because SATA SSDs cost less than PCIe SSDs and fewer signature servers are needed. Furthermore, computer resources are saved by eliminating the need to retrieve large amounts of unnecessary data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the disclosure.

Embodiments according to the invention are thus described. While the present disclosure has been described in particular embodiments, it should be appreciated that the invention should not be construed as limited by such embodiments, but rather construed according to the following claims.

What is claimed is:

1. A data deduplication method, comprising:
receiving, by a controller in a solid state drive (SSD), a signature calculated using a chunk of data and an address that is calculated using the signature;
using the address to locate information stored in a signature library;
determining, by the controller, whether the signature matches the information in the signature library, the information in the signature library indicative of whether the chunk of data is stored on the SSD; and
generating, by the controller, a signal having a value that indicates a result of said determining, wherein if the chunk of data is stored on the SSD then the chunk of data is not written to the SSD and otherwise the chunk of data is written to the SSD.

2. The method of claim 1, wherein the signal comprises a single binary bit, wherein the bit has a first value if the signature matches the information in the signature library and the bit has a second value if the signature does not match the information in the signature library.

3. The method of claim 1, wherein if the signature matches the information in the signature library then the method further comprises incrementing a counter associated with the chunk of data.

4. The method of claim 1, wherein if the chunk of data is written to the SSD, then the method further comprises:
adding the signature to the signature library at the address calculated using the signature; and
incrementing a counter associated with the chunk of data.

5. The method of claim 1, wherein the controller comprises a deduplication processor operable for comparing the signature and the information in the signature library.

6. The method of claim 5, wherein the deduplication processor comprises a plurality of gates that perform a bit-by-bit comparison of the signature and the information in the signature library.

7. The method of claim 1, wherein the SSD is a SATA (Serial Advanced Technology Attachment) SSD.

8. A data deduplication system, comprising:
a signature server comprising:
a central processing unit (CPU);
a memory coupled to the CPU; and
a solid state drive (SSD) coupled to the CPU and the memory and comprising a controller, wherein the SSD comprises a storage element that stores a signature library comprising signatures for blocks of data stored by the SSD;
wherein the signature server is configured to perform an analysis of data generated by a plurality of applications and to identify and remove a redundant block of the data prior to storage of the data in the SSD, the analysis comprising:
receiving, by the controller, a signature for a block of the data, wherein the signature is calculated using the data in the block;
calculating an address using the signature;

using the address to locate information in the signature library;

comparing, by the controller, the signature with the information; and generating, by the controller, a signal having a value that indicates a result of said comparing, wherein if the signature matches the information then the block of data is redundant and is not written to the SSD, wherein if the signature does not match the information then the block of data is written to the SSD.

9. The system of claim 8, wherein the signal comprises a single binary bit, wherein the bit is a first value if the signature for the block of data matches a signature of the signatures in the signature library and a second value if the signature for the block of data does not match a signature of the signatures in the signature library.

10. The system of claim 8, wherein if the signature for the block of data matches the information in the signature library then a counter associated with the block of data is incremented.

11. The system of claim 8, wherein if the signature for the block of data matches the information in the signature library then metadata associated with the signature for the block of data is updated, wherein the metadata is useful for recovering a data file that includes the block of data.

12. The system of claim 8, wherein the SSD is coupled to the CPU and the memory via a SATA (Serial Advanced Technology Attachment) bus.

13. A solid state drive (SSD), comprising:
a plurality of storage elements;
a write path coupled to the storage elements and operable for data compression, data encryption, and error correction code (ECC) encoding; and
a read path coupled to the storage elements and operable for ECC decoding, data decryption, and data decompression;
wherein the read path further comprises a deduplication processor, wherein, in response to a request to write a chunk of data to the SSD, information is extracted from a storage element of the plurality of storage elements and the deduplication processor compares the information to a signature for the chunk of data and generates a signal that indicates whether or not the signature matches the information; and wherein the chunk of data is written to a storage element of the plurality of storage elements if the signal indicates that the signature does not match the information in the signature library, wherein if the signal indicates that the signature matches the information in the signature library then the chunk of data is not written to a storage element of the plurality of storage elements.

14. The SSD of claim 13, wherein the signature is calculated using the chunk of data and the information extracted from the storage element is located using an address calculated using the signature for the chunk of data.

15. The SSD of claim 13, wherein if the signature and the information match then a counter associated with the chunk of data is incremented.

16. The SSD of claim 13, wherein if the signature and the information do not match then a signature library is updated to include the signature and a counter associated with the chunk of data is incremented.

17. The SSD of claim 13, wherein the deduplication processor comprises a plurality of exclusive-OR (XOR) gates coupled to an OR gate, each gate of the plurality of XOR gates comparing a bit value of the signature and a respective bit value of the information; wherein the OR gate generates the signal using outputs from the XOR gates; and wherein the signal comprises a single binary bit having a first value if the signature and the information match and a second value if the signature and the information do not match.

18. The SSD of claim 13, wherein the SSD is a SATA (Serial Advanced Technology Attachment) SSD and the storage elements comprise NAND dies.

* * * * *